United States Patent [19]

Vasiliev

[11] Patent Number: 5,577,412
[45] Date of Patent: Nov. 26, 1996

[54] APPARATUS FOR CONVERTING A RECIPROCATING MOTION INTO UNIDIRECTIONAL ROTATION

[76] Inventor: Gennady V. Vasiliev, ul.40 let Oktyabrya, d.24, kv.30, 656023, Barnaul, Russian Federation

[21] Appl. No.: 295,716
[22] PCT Filed: Oct. 16, 1992
[86] PCT No.: PCT/RU92/00188
§ 371 Date: Aug. 26, 1994
§ 102(e) Date: Aug. 26, 1994
[87] PCT Pub. No.: WO94/09290
PCT Pub. Date: Apr. 28, 1994
[51] Int. Cl.$^6$ .................................................. F16H 25/08
[52] U.S. Cl. .................. 74/127; 74/143; 280/244
[58] Field of Search ..................... 74/127, 142, 143; 280/244, 253

[56] References Cited

U.S. PATENT DOCUMENTS

| | | | |
|---|---|---|---|
| 4,762,332 | 8/1988 | Seol ..................... | 74/142 X |
| 4,829,841 | 5/1989 | Ogawa ..................... | 74/127 |
| 4,865,344 | 9/1989 | Romero, Sr. et al. ....... | 74/142 X |
| 5,362,081 | 11/1994 | Beidler et al. ........... | 74/143 X |

FOREIGN PATENT DOCUMENTS

| | | | |
|---|---|---|---|
| 549790 | 12/1990 | European Pat. Off. | ................ 74/127 |
| 2429662 | 1/1976 | Germany. | |
| 2823729 | 12/1978 | Germany. | |
| 314951 | 11/1971 | U.S.S.R.. | |

*Primary Examiner*—Charles A. Marmor
*Assistant Examiner*—Troy Grabow
*Attorney, Agent, or Firm*—Collard & Roe, P.C.

[57] ABSTRACT

The apparatus has the form of a non-self-braking helical mechanism located inside casing (24) and having a driving member (2) and a driven member (1) connected to the driving member (2) through rolling bodies (3). The driving member (2) is connected to unit (5) for applying an axial force to ensure free axial displacement, free rotation, locking, and engagement with two surfaces, of which one is a locking surface, and the other is a sliding surface, with corresponding identical surfaces of the unit (5). The unit (5) is connected to a mechanism for generating an axial force in the form of a helical transmission (9, 11) ensuring generation of a torque to change the turning angle of the driven member (1), and has a mechanism (17) for varying the axial force. Driving member (9) of helical transmission (9, 11) is positioned coaxially with the driven member (1) and rigidly connected to unit (5) and to mechanism (17) for engagement with the driving and driven members (2, 1).

16 Claims, 10 Drawing Sheets

APPARATUS FOR CONVERTING A RECIPROCATING MOTION INTO UNIDIRECTIONAL ROTATION

FIELD OF THE INVENTION

This invention relates to the art of transmitting rotation to objects, and more particularly to an apparatus for converting a reciprocating motion into unidirectional rotation.

BACKGROUND OF THE INVENTION

There is known a device for converting a reciprocating motion into unidirectional rotation (PCT/SU90/00280) in the form of a non-self-braking helical mechanism housed in a casing. The helical mechanism has a driving member in the form of a screw with a unit for applying an axial force, and a driven member in the form of a nut journaled in bearings inside the casing and connected to the driving member through rolling bodies. The driven and driving members make up a helical rolling transmission. Connected to the unit for applying an axial force is a mechanism for generating and varying this force fashioned either as a controllable power cylinder, or as a hinged-lever system capable of smoothly varying the ratio between the lever arms.

However, the known hinged-lever mechanisms for generating and varying an axial force produce radial component forces that negatively affect the efficiency of the axial force application unit in operation by causing its deformation and skewing. Also, the power elements of such systems, for example, the casing taking up the forces of reaction from forces exerted on the driven member must have substantial dimensions and weight to provide the required rigidity.

SUMMARY OF THE INVENTION

This invention is directed toward the provision of an apparatus for converting a reciprocating motion into unidirectional rotation in which by virtue of varying the engagement of a mechanism for generating an axial force, unit for applying an axial force, driving and driven members it would be possible to ensure the movement, smooth braking, reversing, free inertia rotation in one direction through preventing rotation in the opposite direction, and free rotation in any direction.

The object of the invention has been attained by that in an apparatus for converting a reciprocating motion into unidirectional rotation in the form of a non-self-braking helical mechanism housed in a casing and having a driving member with a unit for applying an axial force connected to this driving member and to a mechanism for generating an axial force and provided with a mechanism for varying this force, the driving member being connected to the unit for applying an axial force for free axial displacement, free rotation, locking, and engagement by its two surfaces, of which one is a locking surface and the other is a sliding surface, with corresponding identical surfaces of the unit for applying an axial force, and also having a driven member connected to the driving member through rolling bodies and capable of rotating about its own axis, according to the invention, the mechanism for generating an axial force has the form of a helical transmission providing a torque to change the turning angle of the driven member, the driving member of the helical transmission being positioned coaxially with the driven member and rigidly connected to the unit for applying an axial force for engagement with the driving and driven members.

Provision of the mechanism for generating an axial force in the form of a helical transmission allows to prevent the appearance of parasitic components of the axial force causing deformation and skewing of the unit for applying the axial force and reducing the general efficiency of the apparatus. The driving force acts in a plane parallel with the plane of rotation of the driving member. Forces of reaction resulting from the forces applied to the driven member are closed up inside the apparatus, therefore allowing to substantially reduce the mass and linear dimensions of the power members taking up these forces, such as the casing. In addition, the driving and motion-converting helical transmissions can be arranged coaxially to still further reduce the size of the mechanism.

The unit for applying an axial force engages both with the driving and driven members of the helical transmission converting the motion. In order to convert the motion, use is made, apart from the axial force, of a torque produced by the driven member.

It is advisable to provide the apparatus with an additional driving member connected to the unit for applying an axial force for engagement therewith, an additional driven member rigidly connected to the driving member, and a braking unit rigidly connected to the driving member of the helical transmission for engagement with the additional driven member; outer thread of the additional driving member having a direction opposite to thread direction of the main driving member.

Such an arrangement allows to obtain a continuous rotation of the driven members by using one driving member of the helical transmission, and also to differentiate the direct and reverse forces.

For obtaining a continuous rotation from two independent power sources, the apparatus is preferably provided with an additional driving member having a separate unit for applying an axial force connected to the driving member of the helical transmission of an additional mechanism for generating the axial force positioned coaxially with the driven member of the main mechanism for generating the axial force, and with an additional driven member rigidly connected to the main driven member. In this arrangement the casing is made up of parts, each such part being connected to the corresponding driven member through bearings and to other members of the helical transmissions engaging with the driving members.

This construction allows to accommodate the driven members between two supports and reduce the size of the apparatus.

To ensure smooth braking at any point in time in any position of the driven members when changing the direction of one of acting forces, it is necessary that the apparatus be provided with a flexible linkage enabling engagement of the driven members and fashioned as springs located inside the driving members of the helical transmissions bearing on projections made at their inner surface and forcing the driving members to each other through rolling bodies by an adjustment screw and thrust bearings. It is also preferable to provide the apparatus with a braking mechanism having a flexible member rigidly connected to one of the units for applying an axial force, capable of engagement with the other unit for applying an axial force, and provided with brake shoes cooperating with the driven member in one direction of the forces exerted on the levers of the mechanisms for varying the axial forces.

In an alternative embodiment of the proposed apparatus the driving members of helical transmissions are adapted to engage with each other through rolling bodies.

The abovedescribed arrangement of the driving members allows a motion conversion by using two separate drives; one such drive transmission forces to the other to combine the action of oppositely directed forces.

Alternatively, the driving members of the helical transmissions are connected to each other through rolling bodies and rigid members for their relative rotation and simultaneous travel of the driving members in one direction while preventing their relative movement in the opposite directions.

This feature of the invention synchronizes the movement of the drive levers as pressure force is exerted on one of these levers. It also affords to combine the drive forces and to use the drive levers as supports.

Preferably, each unit for applying an axial force is made integral with the corresponding driving member, the units for applying axial forces are rigidly interconnected, whereas the driving members are connected by rolling splines to the casings. Other members of the helical transmissions engaging with the driving members are also connected to the casings for rotation. In addition, each part of the casing is preferably provided with annular cavities to accommodate the driven and driving members.

This gives the advantage of applying drive forces in the plane of rotation of the levers. A combination of the units for applying axial forces with the driving members ensures reduced overall dimensions of the apparatus.

It would be advisable to provide the apparatus with a multi-position switch for reversing and braking of the driven member after stopping, this switch being moved and locked relative to the unit for applying an axial force to brake the driven member as it rotates in any direction, and to allow free rotation of the driven member in one direction and protect it against rotation in the opposite direction. In the position of the multi-position switch corresponding to a braking action the total value of clearances between the engaging locking surfaces of the unit for applying an axial force and switch should preferably be smaller than the total value of clearances between their sliding surfaces. The value of clearance between the locking surfaces at either side should be less than the value of clearance between the sliding surfaces.

It is advisable that such a multi-position switch be provided with thrust rings of bearings with rolling bodies connected to a sliding nut mounted on the driven member for reciprocations therealong and locking by a control handle rigidly connected to the driven member to ensure engagement of locking and sliding surfaces of the unit for applying an axial force and driving member in the course of reversing and braking after stopping the driven member.

This construction of the multi-position switch allows to use easily detachable drive levers.

The proposed apparatus can be additionally provided with a multi-position switch ensuring reversal and free rotation of the driven member in any direction and capable of being moved and locked relative to the unit for applying an axial force providing free rotation of the driven member in any direction, as well as free rotation of this member in one direction with protection against rotation in the opposite direction; in a position of this switch corresponding to free rotation of the driven member in any direction the total value of clearances between engaging locking surfaces of the unit for applying an axial force and switch must be greater than the total value of clearances between their sliding surfaces; the value of clearance between the locking surfaces at either side must preferably be greater than the value of clearance between the sliding surfaces; or, alternatively, the apparatus may be provided with two multi-position switches ensuring reversal of continuous rotation, free rotation of the driven members in one direction and protection against their rotation in the opposite direction, free rotation of the driven members in any direction and braking of the driven members rotating in any direction; each such multi-position switch being moved and locked relative to the corresponding unit for applying an axial force; in the position of each multi-position switch corresponding to a braking action the total value of clearances between engaging locking surfaces of each switch and corresponding unit for applying an axial force being preferably greater than the total value of clearances between their sliding surfaces; the value of clearance between the locking surface at either side being preferably greater than the value of clearance between the sliding surfaces.

It would be most advisable to provide each multi-position switch with a hollow rod rigidly secured to the unit for applying an axial force and adapted to be locked and reciprocated axially relative to the driving member by a control handle with a lock member; the unit for applying an axial force should preferably have an additional locking surface to act on the driving member by an additional oppositely directed force, whereas the driving member should be connected to the driving member through rolling bodies received in radial-thrust rings rigidly connected to the driving member.

This arrangement allows to reduce the size of the mechanism for obtaining continuous rotation of the driven members.

In addition, the proposed apparatus can be further provided with a mechanism for producing a torque transmitted to the unit for applying an axial force connected thereto, and a mechanism for varying the torque in response to variations in the axial force, the two mechanisms being interconnected. Provision of such mechanisms allows to substantially change the torque without increasing the axial forces.

In order to use the proposed apparatus in situations requiring substantial torques or high speed, it is necessary that the mechanism for producing the torque be provided with a locking member ensuring its rigid connection to the mechanism for varying the axial force.

It is advantageous that the mechanisms for varying the axial force and torque be integrated into one mechanism in the form of a telescoping lever connected to the driving member of the helical transmission in turn rigidly linked to the unit for applying an axial force. This allows to change the output characteristics of the driven member.

For improving engagement of the driving members with the units for applying axial forces it is preferable that their locking surfaces be fabricated from steel, and their sliding surfaces be defined by rolling bodies.

To separate the stroke of the driving member resulting in a movement of the driven member, and the stroke executing a braking action of the driven member, the driving member is provided with adjustable stops intended to prevent or ensure engagement of the unit for applying an axial force with the driven member on friction elements of smooth and emergency braking located at the opposite sides of the unit for applying an axial force and connected to the driven member; the stops are fabricated from a resilient material.

Projections having tops thereof engaging with the surface of the flange of the driving member are provided to separate a film of oil in the clearance between the unit for applying an axial force and flange of the driving member at the end surface of the unit for applying an axial force.

BRIEF DESCRIPTION OF THE DRAWINGS

The invention will now be described in greater detail with reference to specific examples of its embodiments taken in conjunction with the accompanying drawings, in which.

BEST MODE OF CARRYING OUT THE INVENTION

Figure 1:
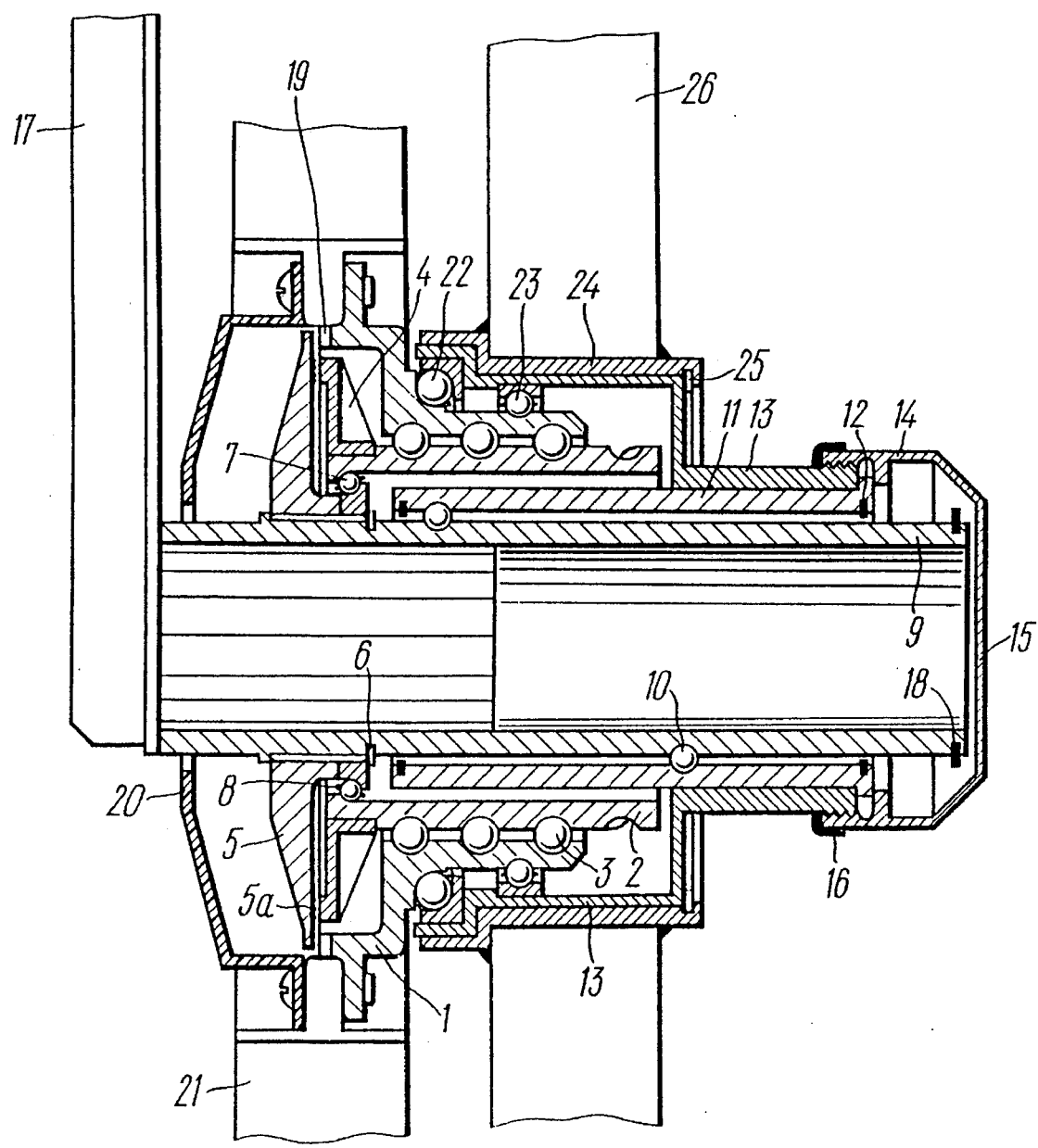
FIG. 1 is a general view of an apparatus for converting a reciprocating motion into unidirectional rotation according to the invention.

Apparatus for converting a reciprocting motion into unidirectional rotation comprises coaxial helical transmissions. The other helical transmission executing the conversion is a ball-bearing transmission, i.e., a nut of driven member 1 (FIG. 1) has annular grooves receiving balls 3 equal in number to the number of screw starts in driving member 2. The screw of driving member 2 has flange 4 press-fitted thereon to engage with unit 5 for applying an axial force in the form of a thrust disk with hub and a radial thrust ring locked in place by ring 6. The driving member 2 cooperates with axial play with unit 5 for applying axial force through balls 7 and separator 8. In addition, end face of the thrust disk of unit 5 facing the flange 4 of the driving member 2 has, for example, concentric projections 5a whose sharp tops engage with the surface of flange 4. Inner driving helical transmission serves as a mechanism for producing an axial force, provides torque transmitted to the unit 5, and comprises a driving member 9 in the form of a hollow screw rigidly connected to the thrust disk of unit 5 and having a multistart thread of enhanced pitch. The driving member 9 engages through intermediate rolling bodies in the form of balls 10 with fixed nut 11 having inner rings 12 to protect the balls 10 against falling out. The nut 11 of the driving helical transmission is rigidly connected to collet shell 13 through a spline joint, nut 142 with flexible membrane 15, and lock washer 16. The direction of threads in the inner and outer helical transmissions can be different. The driving member 9 is rigidly linked with a telescoping lever 17 of mechanism for varying the axial force, and is provided with a stop 18 in the form of a resilient ring member. A friction ring 19 for emergency braking is secured to the end face of the nut of the driven member 1 facing the thrust disk of unit 5. In this case the inner and outer helical pairs have left-hand threads. To ensure a smoother braking, the apparatus has a brake flange 20 secured to the nut of the driven member 1. The driven member 1 is connected to an actuating mechanism, such as wheel 21. In addition, this member 1 is mounted on bearings 22 and 23 inside the collet shell 13 which is rigidly secured in casing 24 having longitudinal projections adapted to be received by split grooves of the collet shell 13 and fixed in place by stop ring 25. The casing 24 is mounted on a post 26.

Figure 2:
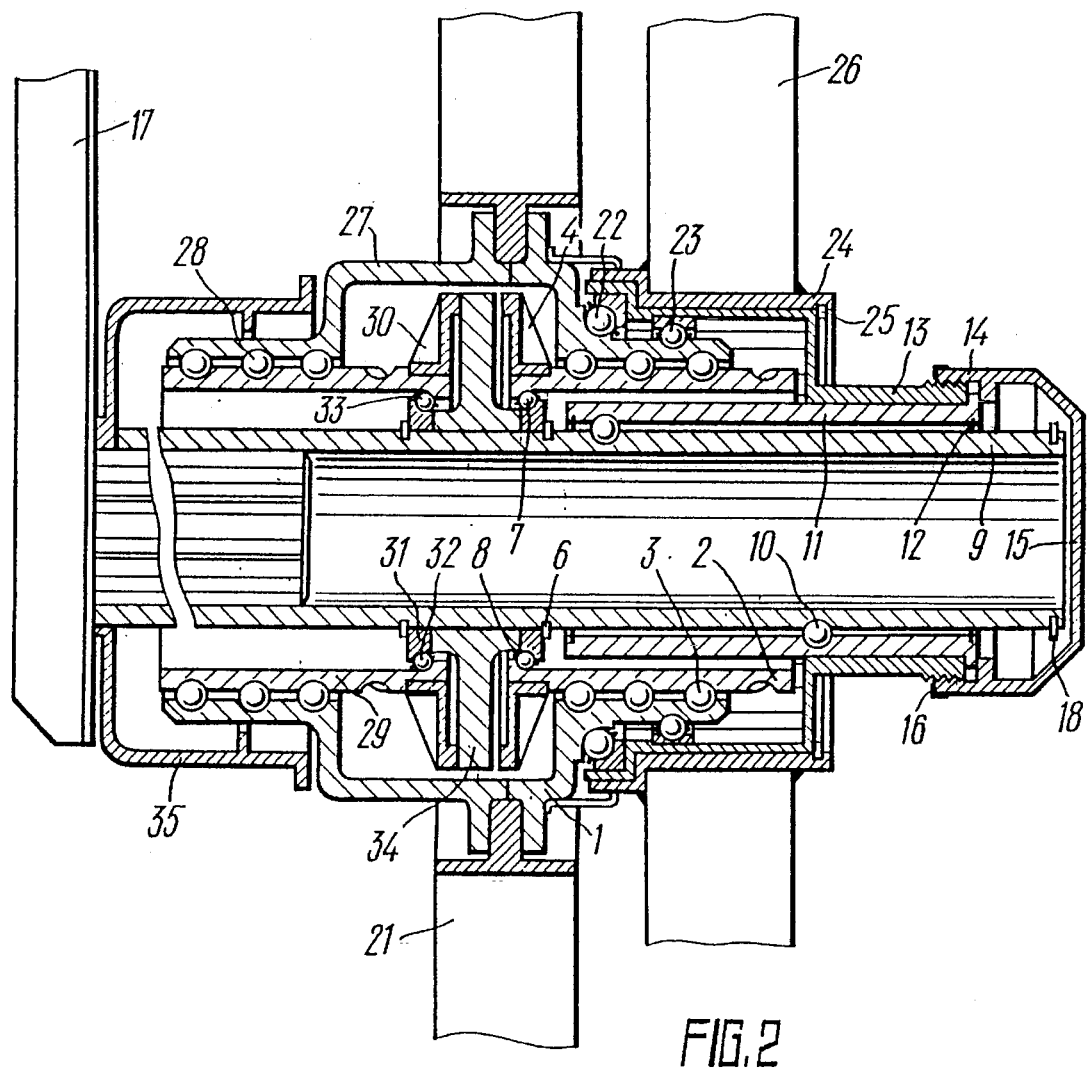
FIG. 2 shows an embodiment of the proposed apparatus capable of generating a continuous inertia rotation.

To ensure continuous inertia rotation of the wheel 21, the apparatus is provided with a driven member 27 (FIG. 2) rigidly connected to the driven member 1 and wheel 21, and engaging through intermediate rolling bodies 28 with an additional driving member 29. The driving member 29 has outer threads of a direction opposite to the thread direction of the driving member 2. The driving member 29 and flange 30 are connected by way a radial thrust ring 31 and balls 32 to separator 33 and unit 34 for applying axial force in the form of a double-action disk with a hub rigidly connected to the driving member 9 also rigidly linked with a braking unit fashioned as cup-shaped friction member 35 engageable with the driven member 27.

In order to ensure continuous rotation and inertia motion from the two driving members, the apparatus is further provided with a driving member 36 (FIG. 3) in the form of a screw connected through rolling bodies 37, such as balls, to a separate unit 38 for applying axial force through a radial thrust ring 39, and a driven member 40 in the form of a nut rigidly connected to the nut of the driving member 1. The members 36 and 40 are connected by means of rolling bodies 41 in the form of balls received in annular grooves made at the surfaces of members 36 and 40 facing each other. Outer surfaces of the driving members 2, 36 have oppositely directed threads. The apparatus is additionally provided with a mechanism for producing an axial force in the form of a helical transmission comprising a driven member 42 fashioned as a hollow screw with enhanced thread pitch mounted coaxially with the driving link 9 and rigidly connected to the thrust disk of unit 38 and connected to the drive member 42 through rolling bodies in the form of balls 43, and fixed nut 44 having inner rings 45 to protect balls 43 against falling out. The driving members 9 and 42 have outer threads of different directions. The nut 44 is rigidly connected through spliens, locking nut 46 and stop 47 to a collet shell 48 mounted inside a casing 49. The driven member 40 is journaled in bearings 50, 51 of the collet shell 48. The driving member 42 is rigidly connected to an additional mechanism for varying the axial force in the form of a telescoping lever 52. End surfaces of the drive members 9 and 42 facing each other have annular grooves adapted to receive rolling bodies in the form of balls 53. These balls 53 are separated and held against falling out by a separator 54 movably connected to one of the drive members 42 or 9.

The driving members 9, 42 are urged to each other by springs 55 compressible through thrust bearings 56 by adjustment screw 56 with nut 58.

Also, the apparatus has a brake mechanism comprising a cup-shaped plate steel spring 59 having a central hole and rigidly connected by screws 60 to the thrust disk of the unit 5 engaging with a conical projection 61 of the unit 38 and provided with brake shoes in the form of friction linings 62.

Figure 4:
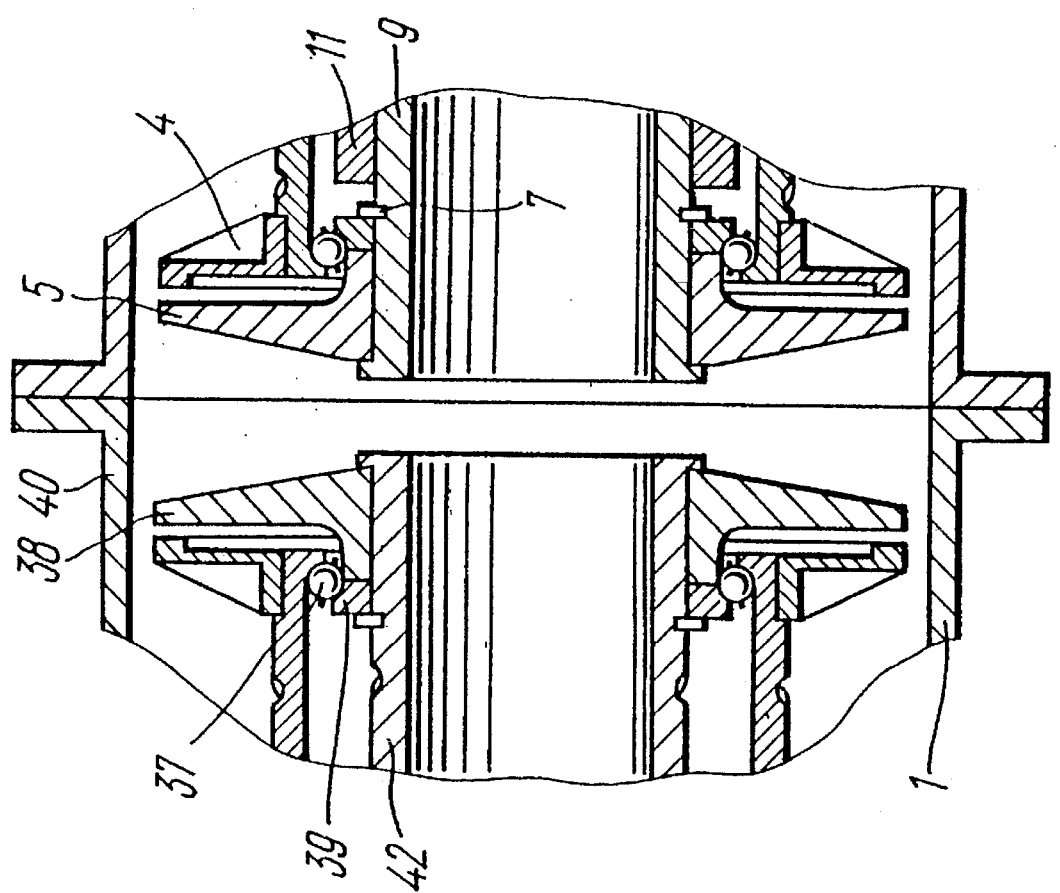
FIG. 4 is a fragmentary view of the same as illustrated in FIG. 3 without engagement between the driving members.

Referring now to FIG. 4, there is shown an alternative embodiment of the proposed apparatus, in which the driving members 9 and 42 are not connected and fail to engage with each other.

Figure 5:
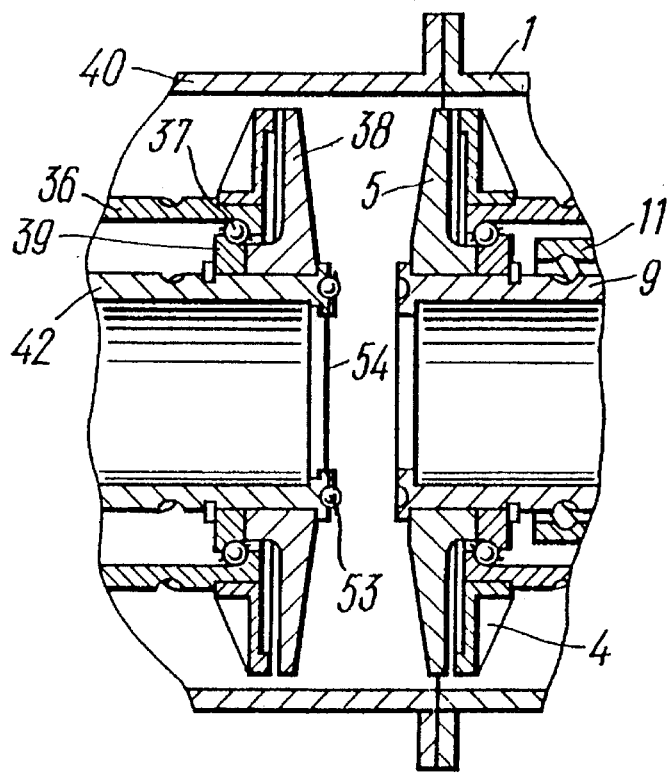
FIG. 5 shows a modified form of the apparatus with two separate movement conversion and two driving helical transmissions, the driving members thereof being capable of relative engagement.

FIG. 5 shows another embodiment of the apparatus, in which the driving members 9 and 42 are not connected, but are intended to engage with each other through rolling bodies in the form of balls 53 with a movable separator 54 connected to the driving member 42.

Figure 6:
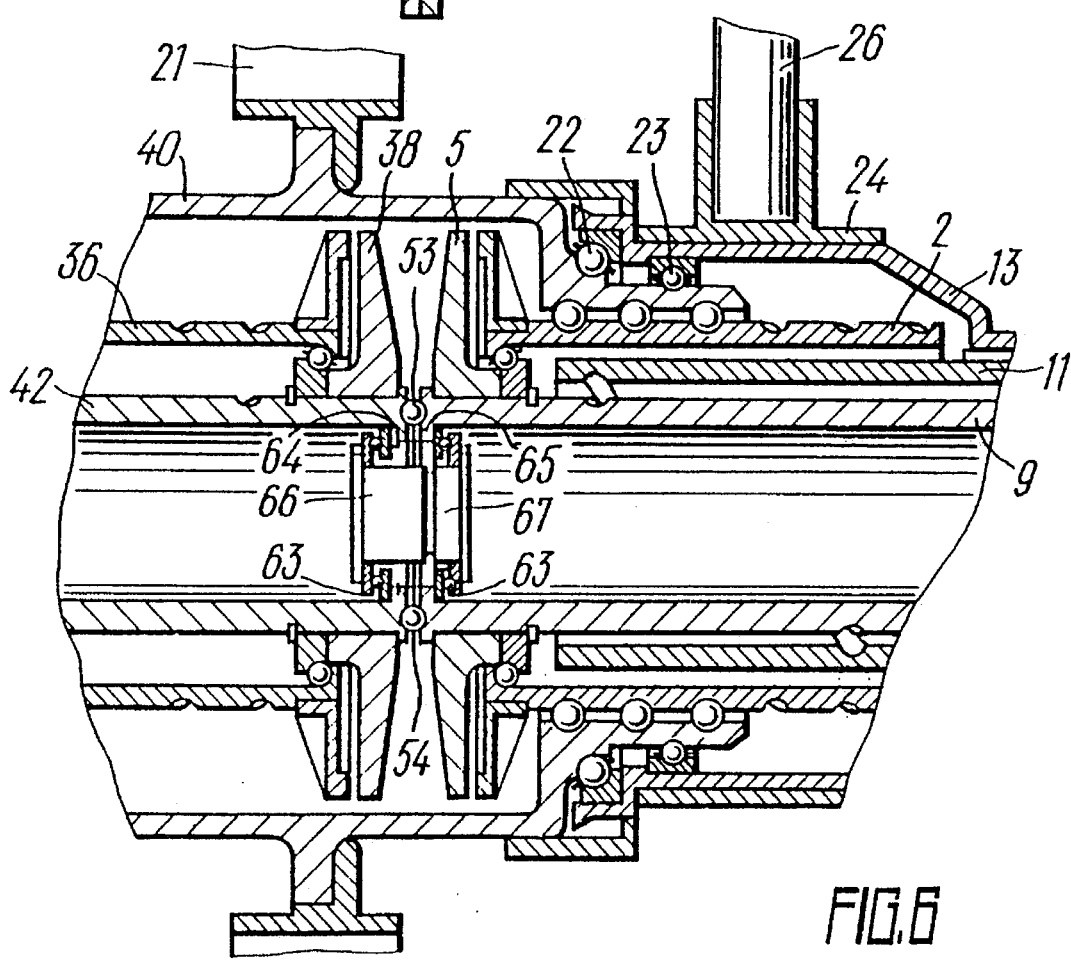
FIG. 6 shows an alternative arrangement, in which the driving members of helical transmissions are connected through rolling bodies and rigid elements.

The driving members 9 (FIG. 6) and 42 can be connected through thrust bearings 63 forced against inner shoulders 64, 65 of the driving members 9 and 42, and rigid elements of a helical brace in the form of screw 66 and nut 67.

Figure 7:
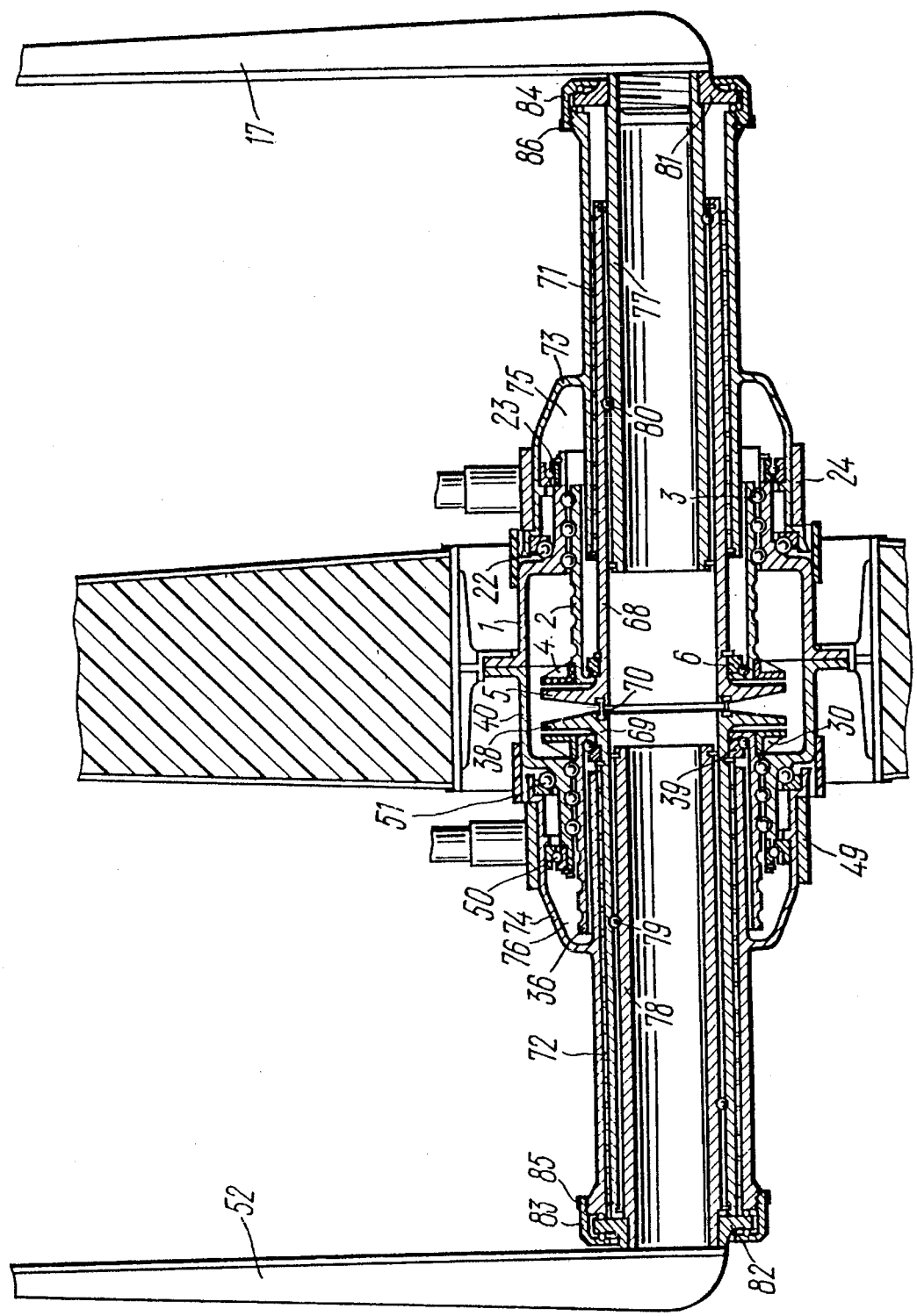
FIG. 7 illustrates a modification of the apparatus, in which each unit for applying an axial force is made integral with the corresponding driving member.

FIG. 7 shows an alternative embodiment of the apparatus, in which the thrust disk of each unit 5 and 38 for applying axial force is made integral with corresponding driving members 68 and 69 generally fashioned as a nut. In addition, the driving members 68 and 69 are rigidly axially connected by a bayonet lock 70. The members 68 and 69 are further connected through outer splines 71, 72 to collet casings 73, 74 whose annular cavities 75, 76 accommodate the driven and driving members 1, 40, 2, 36. Other members 77, 78 of the helical transmission fashioned as screws connected to nuts of driving members 68, 69 through rolling bodies, such as balls 79, 80, are secured by means of thrust bearings 81, 82 and nuts 83, 84 with stops 85, 86.

In order to reverse the unidirectional rotation and execute a braking action after stopping the driven member 1 (FIG. 8), the proposed apparatus has a multi-position switch. In this case unit 87 for applying an axial force is preferably fashioned as a disk with a hub engageable by its outer tapered steel surfaces with inner steel surfaces of a hollow flange assembly 88 rigidly connected to the driving member 2. The disk 87 has ports to receive fastening elements 89 rigidly connecting and centering thrust rings 90 of bearings of the multi-position switch with balls 91 and separators 92. The fastening elements 89 are connected to the rim of a sliding nut 93 by way of stop rings 94. The sliding nut 93 is connected to the driving member 9 by a threaded connection. It is also rigidly connected by screws 95 to a control handle linked to flexible plate 97 having a projection to lock it in one of three grooves of driving lever 17 by a lock mechanism 98. The travel path of driving member is limited at one side by the membrane 15 of nut 14, and at the other side by nut 11 and flexible ring of stop 18. A coaxial casing 99 fabricated from a high-friction material and rigidly connected to the driven member 1 serves to ensure smooth braking.

Figure 8:
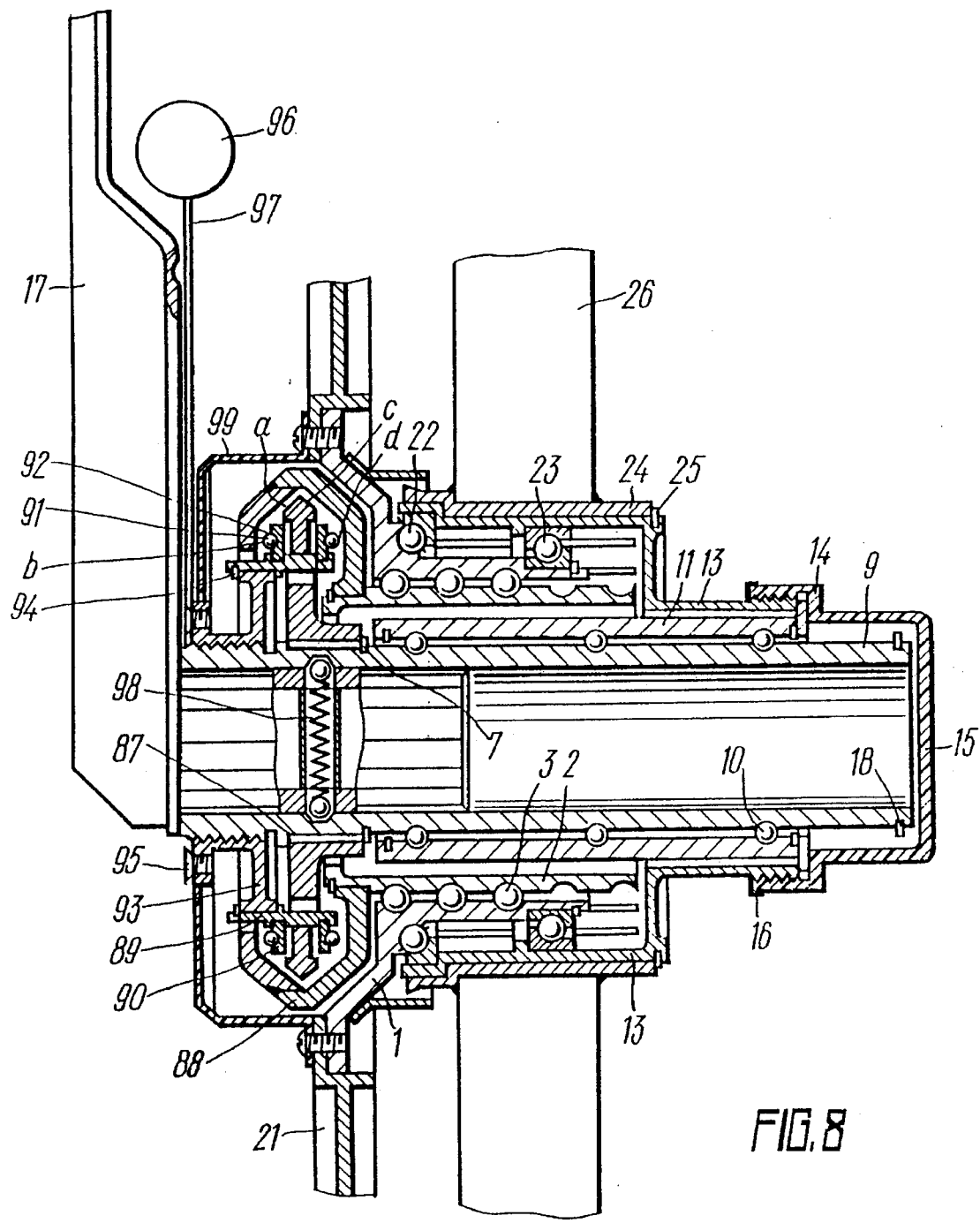
FIG. 8 shows one more construction of the apparatus capable of reversing the unidirectional rotation of the driven member and braking thereof after stopping.

In FIG. 8 all clearances between the engaging locking and sliding surfaces of the disk 87 and driving member 2 are indicated by reference characters a, b, c, d. In the middle corresponding to a braking action the clearances a, b, c, d are distributed in such manner that the total value (a+c) of clearances a, c between the engaging locking surfaces of the disk 87 and flange 88 of the driving member 2 is smaller than the total value (b+d) of clearances b, d between their sliding surfaces, i.e., a+c<b+d, and the following inequalities must be fulfilled:

$a<b$ and $c<d$.

Alternatively, the proposed apparatus may be provided with a multi-position switch ensuring reversal and free rotation of the driven member 1 (FIG. 9) in any direction thanks to changing the engagement of the driving link 2 with unit 100 for applying an axial force fashioned in this case as a hollow flange assembly engageable with disk 101 of the driving member 2. Radial-thrust annular grooves of the inner projection of the driving member 2 receive balls 102 embraced by split rings 103 fixed in place by a stop ring 104 on the driving member 9. The flange of unit 100 is threadedly connected to a hollow rod 105 of multi-position switch linked to the driving member 9. Secured to tailpiece of rod 105 by anchor 106 and nut 107 is a control handle 108 affixed to a flexible plate 109 and provided with lock 110. The handle 108 is stopped in one of three positions. The apparatus also has casing 111 secured to a lever 112.

Figure 10:
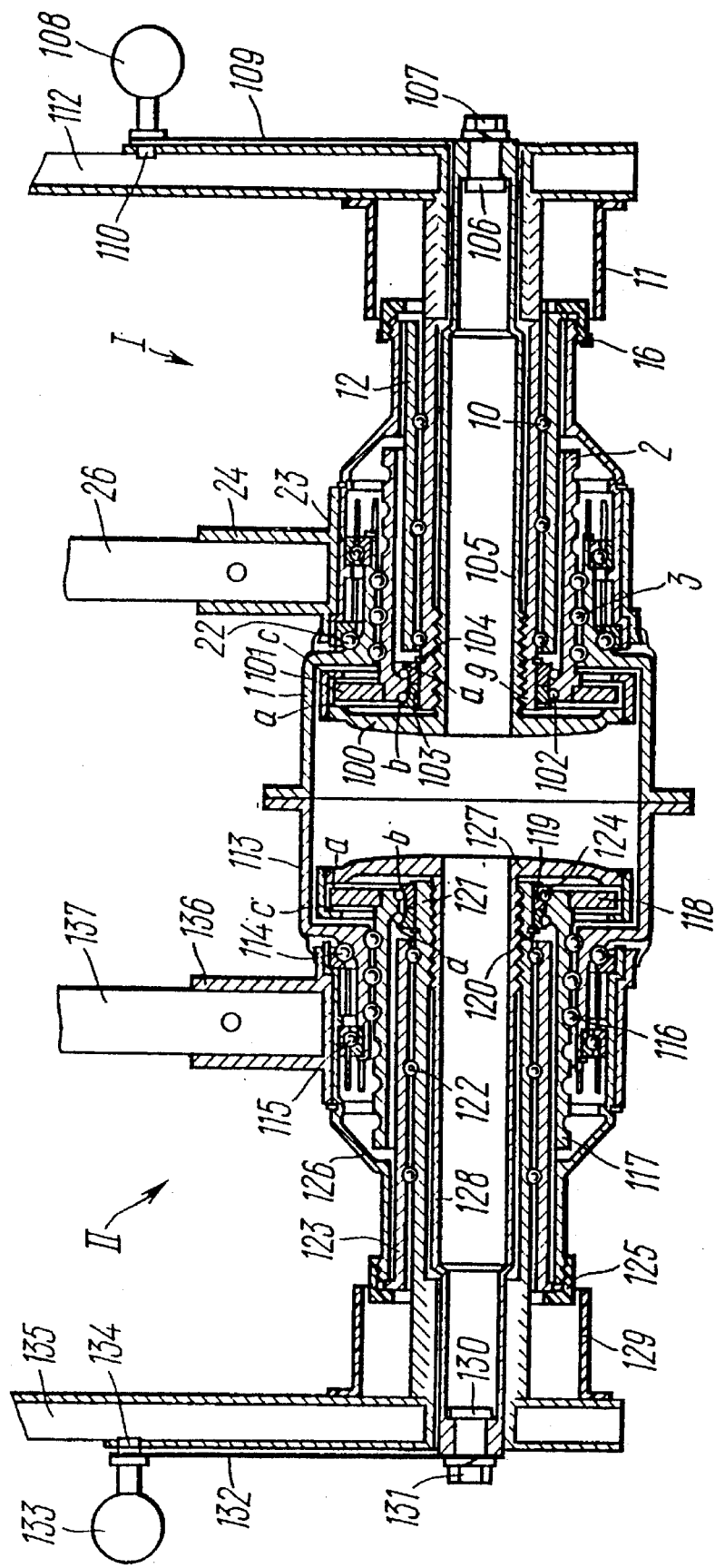
FIG. 10 shows a modification with two helical mechanisms.

An embodiment of the proposed apparatus shown in FIG. 10 comprises a helical mechanism II positioned in symmetry with the helical mechanism I. The mechanism II has a construction substantially similar to the construction of the mechanism I, and includes the following parts: driven member 113, bearings 114, 115, balls 16, driving member 117 with disk 118, split rings 119, stop ring 120, driven member 121, balls 122, fixed nut 123, balls 124, stop nut 125, collet casing 126, flange 127 of axial force application unit, hollow rod 128 of multi-position switch, casing 129, anchor 130, nut 131, flexible plate 132, control handle 133, lock 134, lever 135, casing 136, and post 137.

Figure 9:
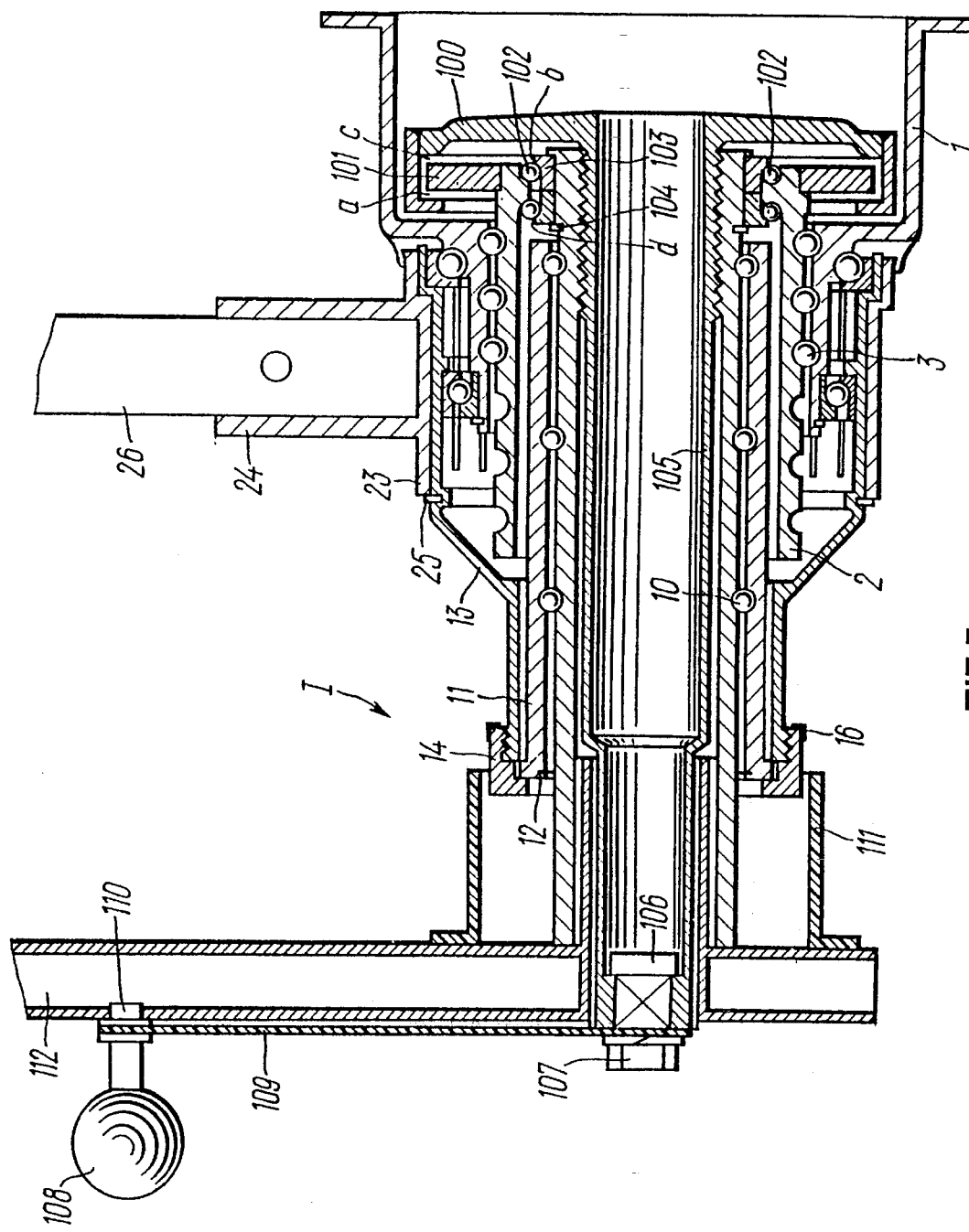
FIG. 9 is a modified form of the apparatus ensuring reversal and free rotation of the driven member in any direction.

With reference to the apparatus shown in FIGS. 9 and 10, in the middle position of the flexible plate 109 with control handle 108 of the switch the clearances b and d between rolling friction surfaces are smaller than the clearances a and c between sliding friction surfaces a>b and c>d, whereby the driven members 1, 113 can rotate in any direction. End positions of the switch correspond to the movement of driven members 1 and 113 to one side, and rotation in the opposite direction is prevented. Therewith, a<b and c>d, or a>b and c<d.

Figure 11:
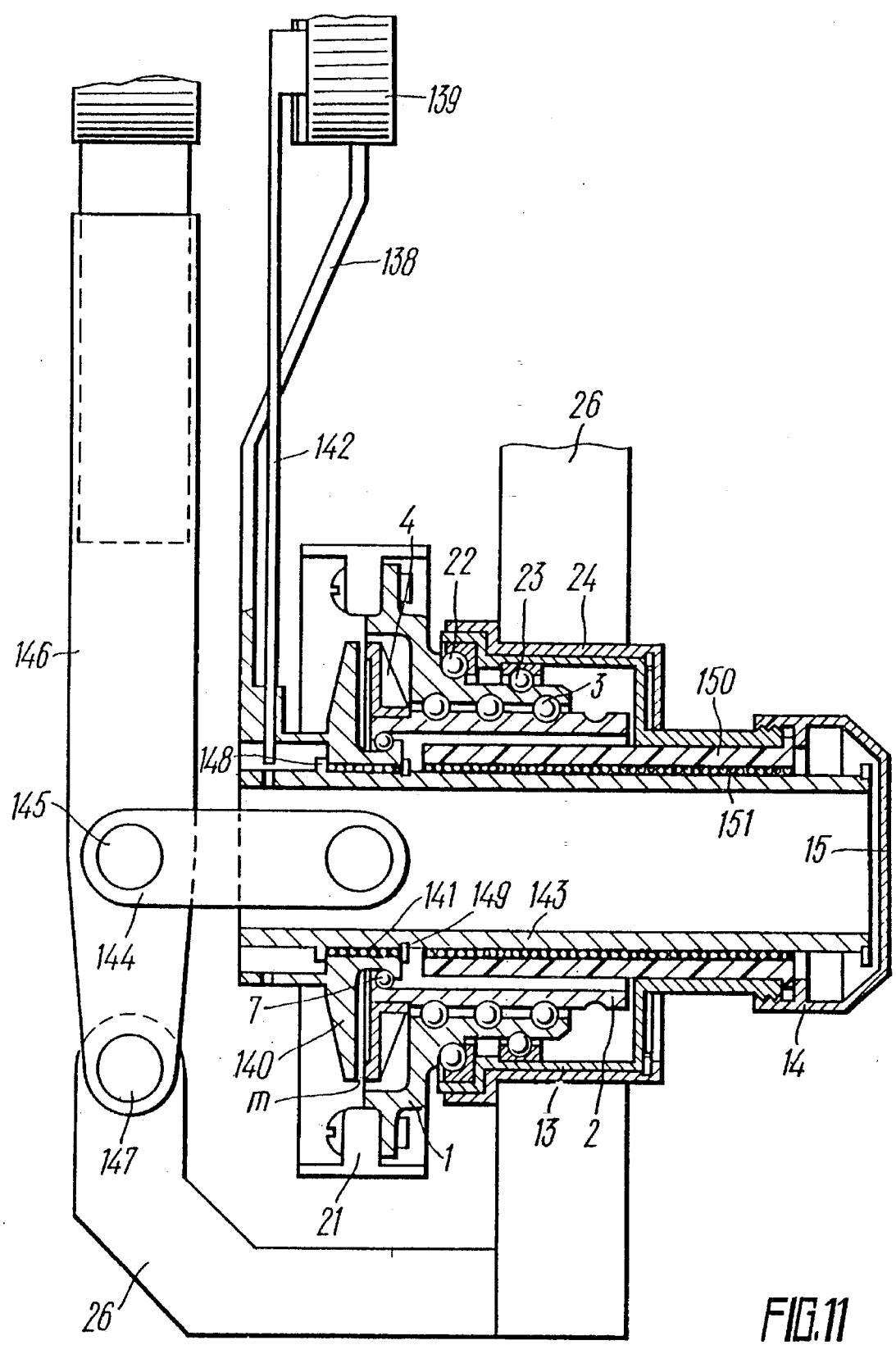
FIG. 11 shows a modification of the apparatus comprising mechanism for producing and varying a torque.

The apparatus illustrated in FIG. 11 has a mechanism for producing a torque in the form of lever 138 and mechanism for varying torque in the form of a telescoping lever 139, the two mechanisms being operatively connected to each other. The lever 138 is rigidly connected to the flange of a sleeve serving as a unit 140 for applying axial force and mounted for rotation on rolling bodies 141 to be also locked by stop member 142 on rod 143 of the mechanism for varying the axial force. This latter mechanism also includes a connecting rod 144 linked by shafts 145 to rod 143 and to telescoping lever 146 adapted to rotate on shaft 147. Movement of of the sleeve of unit 140 axially on rod 143 is limited by lug 148 provided on rod 143 and stop ring 149. Stop member 142 can be moved on the lever 139. The rod 143 is received in guide sleeve 150 having linear bearings 151, and is rigidly connected by nut 14 to shell 13 affixed by means of stop ring 25 and spline joint to casing 24. The casing 24 and shaft 147 are rigidly connected to post 26.

The herein proposed apparatus for converting reciprocation motion into unidirectional rotation operates in the following manner.

With the greatest length of the telescoping lever 17 (FIG. 1) movement of the operator's hand causes this lever to travel from one end position to the other. In turn, the driving member 9 in the form of a screw rigidly connected to the lever 17 executes reciprocation together with the unit 5 on the fixed nut 11. The unit 5 moves to each side to engage with the driving member 2 either through the flange 4, or through the balls 7. The driving member 2 rotates the driven member 1. In the course of movement of the unit 5 toward nut 14 the force is transmitted from unit 5 to driving member 2 through flange 4. Therewith, the disk of unit 5 having sharp concentric projections 5a acts to bite through an oil film to ensure a clutching or locking action.

When the direction of rotation of the driven member 2 and driving member 9 coincide, the turning angle of the driven member 1 increases to a value proportional to the turning angle of the driving member 9. Conversely, when the direction of rotation of these members is opposite, the turning angle of the driven member 1 will be reduced by the same value. This is generally associated with the preferred thread pitch of the driving member 9 and helical transmission influencing a change in the torque or the speed of rotation. In the course of a reverse movement, that is away from nut 14, the unit 5 acts on the driving member 2 through rolling bodies in the form of balls 7. Since the moment of inertia of the driving member 2 is substantially lower than that of the driven member 1, then in any case the driving member 2 will execute a helical movement relative to the driven member, and the direction of rotation of these members 1 and 2 will coincide.

With the maximum length of the lever 17 and optimized amplitude of movements it will have the least turning angle, and the driving member 9 will execute helical movement to travel a distance which is only a fraction of the maximum travel path. Within the travel path in the movement of the driven member 1 it is possible to vary the initial positions and frequency of movements of the lever 17. At any point in time and in any position it is possible to stop the lever 17, whereby the driven member 1 will force it by its threaded surface through balls 3 to the rolling friction surface of unit 5 to rotate this unit 5 with no resistance to rotation. In order to increase the speed of motion, particularly when an increase in the frequency of movements makes no sense, the length of lever 17 should be preferably reduced to thereby increase its turning angle. This will lead to an increase in the travel path of the driving member 9, and consequently to a greater turning angle of the driven member 1. Therefore, by varying the amplitude, frequency of motions of lever 17, and changing its end positions and its length it is possible to select the required conditions for the movement of the driven member 1 and wheel 21, for example, of a sporting wheelchair.

In order to execute a smooth braking action, it is necessary to apply a force sufficient to overcome the force of the flexible ring of stop 18. The unit 5 is brought into engagement with the brake flange 20, and a friction torque produces a repulsive force therebetween. For emergency braking it is necessary to overcome the force of flexible membrane 15 of nut 14. The unit 5 engages with friction ring 19, and the braking torque tends to enhance their engagement leading to self-tightening of the driven member 9.

When using tow outer helical transmissions, the common force application unit 34 (FIG. 2) initiates simultaneous movement of the two driving members 2 and 29. One such member rotates the rigidly linked driven members 1 and 27 to act thereon through flanges 4 or 30, whereas the other driving member 2 or 29 executes engagement through balls 7 and 28 to be unscrewed from the corresponding driven member 1 or 27. In this manner a continuous rotation of wheel 21 is ensured. When the action of forces is terminated, rotation by inertia continues. More particularly, thanks to the action of driven members 1 and 27 a clearance is formed between flanges 4 and 30. Therewith, the driving members 2 and 29 continue to rotate and at the same time to engage with the unit 34 through balls 7 and 32. Braking action is effected when the friction member 35 exerts force on the driven link 27 and the end face of member 9 engages with the membrane 15, although this requires overcoming the resistance of the flexible membrane 15.

This construction of the apparatus ensuring continuous rotation of the driven members 1, 27 and rotation by inertia is especially efficient when used as a drive of a wheelchair. In the course of the travel of lever 17 away from the operator, that is when his arms extend and his back is pressed against the seat-back of the wheelchair, the force exerted on the lever 17 is substantially greater than the force produced by the operator as his arms move in the opposite direction. Taking this fact into consideration, the direction of threads in the members 9, 11, 1, 27, 2, and 29 is such that in the course of moving the lever 17 away from the operator the direction of rotation of the driven members 1 and 27 coincides with the direction of rotation of the driving member 2 or 29 engaging therewith, that is the turning angle of the driven members 1 and 27 increases. When the lever 17 is moved toward the operator, a like torque is produced in the driven members 1 and 27, although under the action of a lesser force due to that the driving member 29 turns in a direction opposite to rotation of the driven members 1 and 27.

Figure 3:
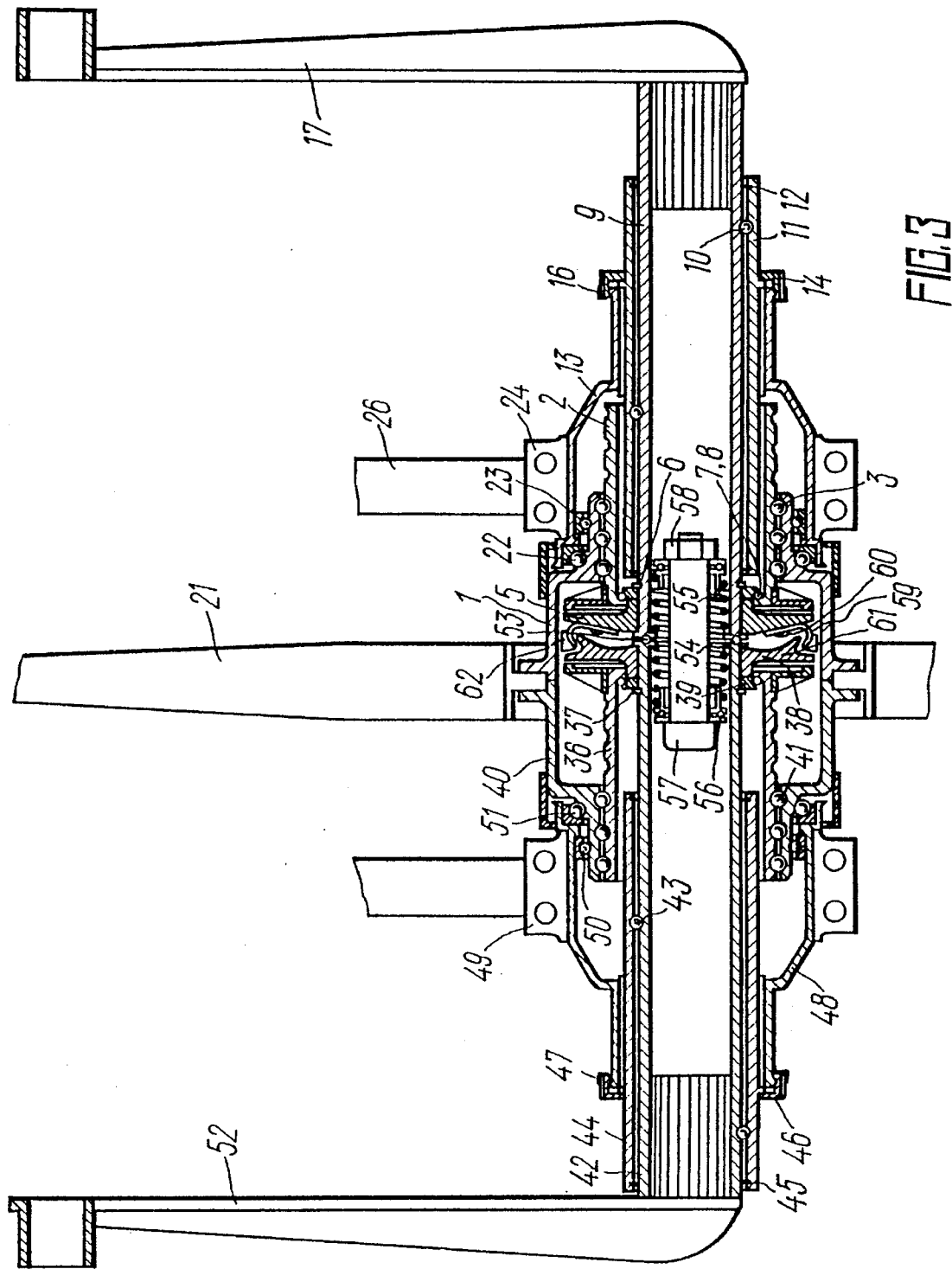
FIG. 3 is a modification of the apparatus with two driving and two helical transmissions converting the motion.

The apparatus shown in FIG. 3 can be used with success in a muscle-driven vehicle. In this case the members 9, 11 and 42, 44 of the helical transmissions have threads of different direction; this being also true with respect to the direction of threads in this members 1, 2 and 40, 36. As the lever 52 is moved away from the operator, the drive member executes a helical motion, and the member 38 acts on the flange of driving member 36 to rotate the driven member 40. At the same time, the driven member 42 acts through springs 55 and thrust bearings 56 on the driving member 9 which executes a helical motion with the direction of rotation opposite to the direction of rotation of the driving member 42. Movement of the member 9 causes the unit 5 to exert pressure through balls 7 on the flange of the driving member 2 which is screwed out of the the driven member 1.

When the travel of lever 53 is changed to the opposite, direction of rotation of the driven member 42 is also changed. Movement from the driven member 42 is transmitted through the balls 53 to the driving member 9, and the unit 5 acts on the flange of the driving member 2, which in turn rotates the driven members 1, 40 and wheel 21. At the same time, the driving member 42 exerts force through balls 37 on the driving member 36 to bring it out of the driven member 40. In this member the alternating action of oppositely direction forces on the lever 52 causes continuous rotation of wheel 21; the torque force of springs 55 being preferably in excess of the clutch force of the driving members 42 and 9.

When simultaneously exerting oppositely directed forces on the levers 17 and 52, such as during the movement of the lever 52 away from the operator and lever 17 toward the operator, rotation of the driving member 42 will cause the unit 38 to act on the flange of the driving member 36. At the same time, the driving member 9 also executing a helical motion will act mostly on the member 38 and driving member 36, and will exert a minor force on the driving member 2 through balls 7. This engagement will cause the driven member 40 to rotate, whereas the driving member 2 will execute helical motion relative to the driven member 1. As a result, the forces of the driving members 9 and 42 to rotate the wheel 21 will be combined.

Changing the direction of force exerted on any of the levers 17 or 52 in any position thereof will cause a braking action due to that the driving members 9 and 42 with oppositely directed outer threads depart from each other. The conical projection 61 of unit 38 will force the spring 59 to bring the friction linings 62 into engagement with the driving links 1 and 40.

The total working stroke of the driving members 9 and 42 is limited by the distance between the end surfaces of fixed nuts 11 and 44 facing each other.

In the absence of cooperation between the driving members 42 and 9 (FIG. 4) the units 5 and 38 engage independently with their respective driving members 2 and 36. Here, the action of oppositely directed forces exerted on the levers 17 and 52 (FIG. 3) ensures continuous rotation of wheel 21 (FIG. 4) by virtue of alternating rotation of the driven members 1 and 40. In response to a simultaneous application of unidirectional forces to the levers 17 and 52 (FIG. 3) the motion is converted when the levers 17 and 52 are moved only in one direction; their travel in the opposite direction results in idling.

The modified form of the proposed apparatus in which driving members 42 and 9 (FIG. 5) engage through rolling bodies in the form of balls 53 operates as follows. The driving members 42 and 9 connected, respectively, to the levers 52 and 17 (FIG. 3) engage independently through the units 5 and 38 with the driving members 2 and 36 to rotate the driven members 1 and 40. Rotation of the driven members 1 and 40 is also possible in response to the action of oppositely directed forces applied to the levers 17 and 52 (FIG. 3) which results in the transmission of forces from one driving member 42 to the other member 9, or vice versa, i.e., the motion conversion forces are combined. This modification of the apparatus according to the invention can be used as a bicycle drive assembly. In this case, the bicycle rider exerts the force of arms and legs on the levers 17, 52. Separate pushing movements of arms and legs, or even their joint pushing and pulling actions are possible.

The alternative modification of the proposed apparatus where the driving members 42 and 9 (FIG. 6) are connected through balls 53, thrust bearings 63, and rigid elements in the form of screw 66 and nut 67 makes it possible to combine the forces transmitted to the driving members 42, 9 and synchronize the movement of these members. With an equality of forces exerted on the two driving members 42 and 9 these forces are mutually compensated and thereby the apparatus fails to convert the motion. When using this modification is a bicycle drive, foot pedals are mounted on the levers 17 and 52 (FIG. 3). Pressure applied to one of the pedals will cause rotation of the driven members 42 and 9 (FIG. 6) and wheel 21, the other pedal and corresponding lever 17 or 52 will be raised, and the leg action can be changed in any position of the pedal at any point in time. In the case of applying a simultaneous and equal pressure to the two pedals the pedals will function as leg supports, and the bicycle will move by inertia. When the pedals are provided with foot clips, the pushing action of one pedal can be complemented with a pulling action of the other pedal to increase the poser of the bicycle drive. The levers will move about a horizontal axis with a general rolling angle of 90 degrees. The levers may telescope to attain a higher transmission ratio.

If each unit 5, 38 (FIG. 7) is made integral with the corresponding driving member 68 and 69, and the elements are connected by bayonet lock 70, the forces produced by the levers 17 and 52 will be combined, and therefore operation of the apparatus will be hereinafter described with a force applied only to the lever 17. Movement of the lever 17 causes the relative helical motion generated in the helical transmission including members 68 and 69 to be resolved thanks to the use of rolling splines into rotational motion of member 77 and translation motion of member 68 and unit 5. As the unit 5 engages with the driving member 2, its translational motion is converted into rotation of the driven member 1. Rigid axial connection of members 68 and 69 ensures a helical motion of the driving member 36 and return travel of the lever 52. In the course of reverse movement of the lever 17 the motion will be converted thanks to the transmission of forces from member 68 to member 69 and unit 38.

To ensure reversal and braking after stopping the driven member 1 (FIG. 8), the apparatus is provided with a multiposition switch. The movement of lever 17 away from the operator causes the clearances between the engaging surfaces of unit 87 and flange 89 of driven member 2 to be distributed as follows: d>c, b<d, the unit 87 engaging with the driving unit 2 on the locking surfaces. As a result, the driving member 2 transmits rotation to the driven member 1. A reverse movement of the lever 17 causes engagement of the unit 87 with driving member 2 on their sliding surfaces for the member 2 to execute idling movement. To reverse the rotation, the flexible plate 97 of the switch is moved to the other end position, whereby the clearances are distributed as follows:

$$a<b; d<c.$$

This will cause the opposite surfaces to engage with sliding and rolling friction.

When plate 97 of the switch assumes the middle position and a<b, c<d, then with fixed lever 17 rotation of the driven member 1 to any side will be prevented because the unit 87 will engage with the driving member 2 on their locking surfaces.

The apparatus shown in FIG. 9 operates as follows. With the flexible plate 109 in its middle position and relationship between clearances a>b and c>d, the driving member 2 executes reciprocating helical motion relative to the driven member 1, since the driven member 1 is connected to the actuating mechanism and has a substantial moment of inertia. A direct force applied to the driven member 1 will cause this member 1 to rotate the driving member 2. The driving member 2 will engage with the driven member 1 on rolling friction surfaces thereby failing to render resistance to rotation. When the flexible plate 109 is brought by handle 108 to one of its end positions, rod 105 of the switch will turn to result in a relative displacement and locking of the flanges of the unit 100 and disk 101 of the driving member 2. In this case the clearances a, b, c, d will be distributed so that the movement of the driving member 2 to one direction causes engagement of the locking surfaces, and the movement thereof to the opposite direction will engage the sliding surfaces, and therefore the motion will be converted to one side, whereas rotation to the other side will be prevented.

The use of two helical mechanisms I and II (FIG. 10) ensures continuous rotation to any side and prevents rotation to the opposite direction. The driven members 1 and 113 rotating in any direction can be braked by turning the switch to different end positions to ensure movement in different directions. In the middle position of the switch free rotation of the driven members 1 and 113 to any side is ensured.

With the provision of mechanisms 138, 139 (FIG. 11) for generating and varying a torque transmitted to the unit 140 for applying an axial force the apparatus operates in the following manner. When pressure is exerted on the lever 146, forces are transmitted through the connecting rod 144, rod 143, and projection 148 to the unit 140 which acts on the flange 4 of the driving member 2. At the same time, lever 138 of the mechanism produces a torque directed to the side of rotation of the driven member 1. The threaded connection of screw 2 and driven nut 1 with intermediate rolling bodies functions as a spline joint to transmit torque to the driven member 1 and wheel 21.

When reversing the driving member 2, intermediate rolling bodies 7 act on this member for it to execute helical motion relative to the driven member 1 rotating in the same direction. The flanges of unit 140 and driving member 2 fail to engage due to the presence of a clearance "m" therebetween. Having accelerated the inertia mechanism to definite rpm, it is possible to terminate the action, whereby the members 2, 1, and wheel 21 will rotate by inertia.

After the acceleration, when high torques are no longer needed, levers 138 and 139 of the mechanisms for producing and varying torque are locked by the stop member 142 relative to the rod 143, and rotation is produced only by the lever 146. When the moment of resistance to rotation becomes substantial, two levers 139 and 146 are operated.

In view of the afore described, the invention makes it possible to materialize the idea of an endless screw by virtue of a difference between the magnitudes of rolling and sliding frictions, low moment of inertia of the driving member 2 (FIG. 1) compared to the loading capacity of the helical transmission, and capacity to transmit rotation energy from one rotating helical member to the other and execute helical motion of one such member relative to the other under the action of axial forces. In turn, this affords the following advantages:

to enhance the efficiency of energy conversion to 80–95%;

to use the apparatus both for generating a motion and for braking;

to execute a joint action of reversal, braking after stopping of the driven member, and free rotation in any direction;

to automatically obtain idling motion in response to the movement of the driven member 1;

to vary the displacement of the driving member 2 within its travel path at any time, in any position thereof, at any allowable speed;

at a preset direction of motion to prevent rotation to the opposite direction;

to ensure a continuous torque of the driven member 1;

to arbitrarily change the amplitude, frequency, and position of the driving member 9;

to execute a braking action through changing the direction of forces acting on the driven member 9, 42;

to ensure separate operation and change relative engagement of the driving member 9, 42, to provide their independent action on the driving members 2, 36, to synchronize the operation of the driving members 9, 42, and to combine the forces produced thereby;

to obtain one revolution of the driven member 1 at small linear displacements of the driving member; and to exceed the speed of rotation of the driven member which the latter assumes as it is acted upon by the driving member.

INDUSTRIAL APPLICABILITY

The invention can be used with success in in many fields of mechanical engineering. The invention may be employed with advantage as energy converters in such muscle-operated vehicles as bicycles, wheelchairs, pedal-driven vehicles for children, training equipment, park attractions, and the like. In power engineering the proposed invention may be used primarily for wave power conversion.

I claim:

1. An apparatus for converting reciprocating motion into unidirectional rotation, comprising:

a nonself-locking screw drive mechanism accomodated in said casing;

a first driving member of said nonself-locking screw drive mechanism; sliding and locking surfaces of said first driving member, a flange of said first driving member, an external cylindrical surface provided with a first-sense thread;

a first plurality of rolling bodies of said nonself-locking screw drive mechanism;

a first driven member of said nonself-locking screw drive mechanism, having an axis of rotation and being associated with said first driving member through the rolling bodies of said first plurality, said first driving member being rotatable about said axis of rotation;

a first axial force generating mechanism adapted also for developing a torque intended for changing the angle of turn of said first driven member;

a first axial force application unit of said nonself-locking screw drive mechanism, associated with said first axial force generating mechanism; sliding and locking surfaces of said first axial force application unit; end face of said first force application unit, facing towards said flange of said first driving member;

clearances between said locking surfaces of said first driving member and said first axial force application unit;

said first driving member associated with said first axial force application unit and capable of free axial motion, free rotation and locking, as well as of cooperating, through said locking and said sliding surfaces thereof, with said locking and said sliding surfaces of said first axial force application unit;

a first axial force changing mechanism of said nonself-locking screw drive mechanism, associated with said first axial force application unit, a first lever of said first axial force changing mechanism;

a first screw drive of said first axial force generating mechanism, a first drive member of said first screw drive arranged coaxially with said first driven member and rigidly coupled to said first axial force application unit and said axial force changing mechanism for interaction with said first driving and said first driven member, a second plurality of rolling bodies of said first screw drive, a first stationary fixed driven member associated with said first drive member through the rolling bodies of said second plurality, an interior space of the first drive member.

2. An apparatus according to claim 1, comprising:

a second driving member arranged coaxially with said first driving member and associated with said first force application unit so as to interact therewith; an external cylindrical surface of said second driving member having a thread of a sense opposite to that of said thread of said first driving member;

a third plurality of rolling bodies;

a second driven member rigidly coupled to said first driven member and associated, through the rolling bodies of said third plurality, with said second driving member;

a brake unit rigidly coupled to said drive member of said screw drive and adapted to interact with said second driven member;

a brake unit rigidly coupled to said drive member of said screw drive and adapted to interact with said second driven member.

3. An apparatus according to claim 1, comprising:

a third driven member;

a fourth plurality of rolling bodies;

a third driving member arranged coaxially with said first driving member and associated with said third driven member through the rolling bodies of said fourth plurality; sliding and locking surfaces of said third driving member;

a second axial force generating mechanism capable also of developing a torque intended for changing the angle of turn of said third driven member;

a second screw drive of said second axial force generating mechanism, a second drive member of said second screw drive arranged coaxially with said first drive member; a fifth plurality of rolling bodies of said second screw drive, a second stationary fixed drive member of said second screw drive associated with said second drive member through the rolling bodies of said fifth plurality;

end surfaces of said first and second drive members, facing each other; an interior space of said second drive member;

a sixth plurality of rolling bodies interposed between said end surfaces facing each other;

a second axial force application unit associated with said third driving member and second drive member; locking and sliding surfaces of said second axial force application unit;

clearances between said locking surfaces of said third driving member and second axial force application unit;

clearances between said sliding surfaces of said third driving member and second axial force application unit;

a second axial force changing mechanism associated with said second axial force application unit; a second lever of said second axial force changing mechanism;

a first plurality of bearings;

a second plurality of bearings;

said casing built up to two components; a first component of said casing associated, through the bearings of said first plurality, with said first driven member and said second stationary fixed drive member; a second component of said casing associated, through the bearings of said second plurality, with said third driven member and second stationary fixed drive member.

4. An apparatus according to claim 1, comprising:

a first multiposition switch adapted for reversal and braking action after said first driven member has stopped, and arranged with a possibility of being moved and locked with respect to said first axial force application unit, whereby there is attained braking of said first driven member when rotating in any sense, as well as free rotation of said first driven member in either sense and prevention of its rotation in the opposite sense;

locking surfaces on each side of said first axial force application unit and first driving member, said surfaces facing each other; clearances between said locking surfaces; sliding surfaces on each side of said first axial force application unit and first driving unit, said surfaces facing each other; clearances between said sliding surfaces; with said first multiposition switch in the position corresponding to braking action, a total amount of said clearances between said locking surfaces of said first axial force application unit and first driving member is less than a total amount of said clearances between said sliding surfaces; the amount of said clearances between the locking surfaces on each side of said axial force application unit and said driving unit is less than the amount of said clearances between the sliding surfaces.

5. An apparatus according to claim 1, wherein said locking surfaces of said first driving member and first axial force application unit are made of steel, said sliding surfaces are established by rolling bodies, and said end face of said first axial force application unit has projections whose pointed tips contact said flange of said first driving member.

6. An apparatus according to claim 1, comprising friction elements of progressive and emergency braking, which are situated on the opposite sides of said first axial force application unit, adjustable stops adapted for preventing or ensuring cooperation between said first axial force application unit and said first driven member through said friction elements of progressive and emergency braking.

7. An apparatus according to claim 3, comprising:

an elastic linkage intended for establishing interaction of said first and second drive members;

first projections provided on the surface of said interior space of said second drive member;

second projections provided on the surface of said interior space of said second drive member;

a first spring of said elastic linkage, said spring being accommodated in said interior space of said first drive member and resting against said first projections;

a second spring of elastic linkage, said spring being accommodated in said interior space of said second drive member and resting against said second projections;

an adjusting screw accommodated inside said first and second springs;

thrust bearings contacting said first and second springs;

said first and second springs intended for pressing said first and second drive members against each other through the rolling bodies of said sixth plurality and with the aid of said adjusting screw and thrust bearings;

a brake mechanism; an elastic element of said brake mechanism rigidly coupled with said first axial force application unit and capable of cooperating with the second axial force application unit; brake shoes of said elastic element, and brake shoes being adapted to interact with said first driven member when said first and second levers are acted upon by unidirectionally applied forces.

8. An apparatus according to claim 3, comprising rigid elements situated in said interior spaces of said first and second drive members; said first and second drive members interlinked through the rolling bodies of said sixth plurality and said rigid elements with a possibility of mutual rotation and simultaneous unidirectional motion, the motion of said drive members in the opposite directions being precluded.

9. An apparatus according to claim 3, wherein said first axial force application unit is made integral with said first drive member, said second axial force application unit is made integral with said second drive member, said first and second axial force application units are rigidly interlinked, and said first and second drive members are associated, through rolling-contact splines, with said respective first and second components of said casing, with which components are also associated said respective first and second stationary fixed drive members with a possibility of rotation; additionally, said first and second components of said casing have annular spaces adapted to accommodate said first and third driven members, and said first and third driving members.

10. An apparatus according to claim 3, comprising:

second and third multiposition switches capable of reversing continuous rotation, free unidirectional rotation of said first and third driven members and prevention of their rotation in the opposite directions, free rotation of said second and third multiposition switches with a possibility of being moved and locked with respect to said respect first and second axial force application units; when each of said second and third multiposition switches assumes the position corresponding to braking action, a total amount of said clearances between said locking surfaces of said first axial force application unit and first driving member, and of said second axial force application unit and third driving member is larger than a total amount of said clearances between said sliding surfaces of said axial force application units and said driving members; the amount of said clearances between the locking surfaces on each side of said axial force application unit and said driving unit is larger than the amount of said clearances between the sliding surfaces.

11. An apparatus according to claim 4, wherein said first multiposition switch comprises thrust race rings of bearings, rolling bodies accommodated in said thrust race rings, a sliding nut associated with said thrust race rings, said nut being located on the first drive member reciprocatingly lengthwise said first drive member and having an operating handle adapted for interacting of said locking and sliding surfaces of said first axial force application unit and first driving member when reversing and braking after said first driven member has come to a standstill.

12. An apparatus according to claim 5, comprising a torque generating mechanism, said torque being transmitted to said first axial force application unit associated with said mechanism, and a torque changing mechanism that varies the torque in compliance with changes in the axial force applied, both of said mechanisms being connected to each other.

13. An apparatus according to claim 6, wherein said adjustable stops are made of an elastic material.

14. An apparatus according to claim 10, comprising a first hollow rod of said second multiposition switch, said rod being rigidly coupled to said first axial force application unit, a second hollow rod of said third multiposition switch, said rod being rigidly coupled to said second axial force application unit, a first operating handle provided with a retainer and associated with said first hollow rod for said rod to lock and reciprocate axially with respect to the first drive member, a second operating handle provided with a retainer and associated with said second hollow rod for said rod to lock and reciprocate axially with respect to the second drive member; radial-thrust race rings rigidly coupled to said first drive member, and rolling bodies fitted in said radial-thrust race rings to establish connection between said first driving member and first drive member; said radial-thrust race rings rigidly coupled to said second drive member, and rolling bodies fitted in said radial-thrust race rings to establish connected between said third driving member and second drive member; each of said first axial force application unit and said second axial force application unit has an additional locking surface for acting on said first driving member and said third driving member, respectively, with an additional force.

15. An apparatus according to claim 12, wherein said torque generating mechanism comprises a locking mechanism that establishes a rigid coupling between said torque generating mechanism and said first axial force changing mechanism.

16. An apparatus according to claim 12, wherein said first axial force changing mechanism and a torque changing mechanism are integrated into a single mechanism which is in effect a telescopic lever associated with said first drive member rigidly coupled to said first axial force application unit.

* * * * *